(12) United States Patent
Hecht et al.

(10) Patent No.: US 9,238,271 B2
(45) Date of Patent: Jan. 19, 2016

(54) DIAPHRAGM CHUCK AND MACHINE TOOL

(75) Inventors: Werner Hecht, Memmelsdorf-Meedensdorf (DE); Johannes Loehrlein, Schesslitz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 761 days.

(21) Appl. No.: 13/457,772

(22) Filed: Apr. 27, 2012

(65) Prior Publication Data

US 2012/0286482 A1    Nov. 15, 2012

(30) Foreign Application Priority Data

May 10, 2011   (DE) .......................... 10 2011 075 568

(51) Int. Cl.
    *B23B 31/32*    (2006.01)
(52) U.S. Cl.
    CPC ........... *B23B 31/32* (2013.01); *B23B 2260/032* (2013.01); *Y10T 279/31* (2015.01)
(58) Field of Classification Search
    CPC  B23B 31/32; B23B 2260/032; Y10T 279/31; Y10T 279/1233
    USPC ....................................... 279/2.05, 4.05, 139
    IPC ......................................................... B23B 31/32
    See application file for complete search history.

(56) References Cited

U.S. PATENT DOCUMENTS

| | | | | | |
|---|---|---|---|---|---|
| 2,483,496 | A | * | 10/1949 | Klemm | 279/139 |
| 2,565,430 | A | * | 8/1951 | Hohwart et al. | 279/4.04 |
| 2,854,237 | A | * | 9/1958 | Richards | 279/4.05 |
| 2,966,362 | A | * | 12/1960 | Richards | 279/2.05 |
| 3,433,492 | A | * | 3/1969 | Frank et al. | 279/2.05 |
| 4,133,544 | A | * | 1/1979 | Halvorsen | 279/46.4 |
| 4,211,425 | A | * | 7/1980 | Halvorsen | 279/46.4 |
| 4,346,535 | A | * | 8/1982 | Asano et al. | 451/239 |

FOREIGN PATENT DOCUMENTS

| | | | |
|---|---|---|---|
| DE | 1 652 942 | | 6/1971 |
| GB | 821969 A | * | 10/1959 |
| GB | 1068846 | | 5/1967 |
| GB | 1068847 | | 5/1967 |
| JP | 63272409 A | * | 11/1988 |
| JP | 01005706 A | * | 1/1989 |
| JP | 2000237906 A | * | 9/2000 |
| SU | 496100 A | * | 3/1976 |
| SU | 1238900 A | * | 6/1986 |

* cited by examiner

*Primary Examiner* — Eric A Gates
(74) *Attorney, Agent, or Firm* — Kenyon & Kenyon LLP

(57) ABSTRACT

A diaphragm chuck for a machine tool has a first clamping diaphragm and a second clamping diaphragm which is offset relative to the first clamping diaphragm along an axial direction. The first clamping diaphragm has multiple first chuck jaws and the second clamping diaphragm has multiple second chuck jaws, and the first and the second clamping diaphragms are detachably connected to one another.

11 Claims, 2 Drawing Sheets

DIAPHRAGM CHUCK AND MACHINE TOOL

BACKGROUND OF THE INVENTION

1. Field of the Invention

The present invention relates to a diaphragm chuck for a machine tool.

2. Description of the Related Art

Such diaphragm chucks are generally known. For example, a diaphragm chuck is known from the published German patent document DE 1 652 942 B which has two groups of chuck jaws which are situated at an axial distance from one another and which are each mounted on a diaphragm for chucking the workpiece, the diaphragm chuck also having an air pressure regulator for unchucking the workpiece. The diaphragm chuck is operated with compressed air in such a way that for unchucking the chuck jaws, compressed air is guided through a channel in the chuck housing, thus causing deformation of the clamping diaphragms. The chuck jaws of one group of chuck jaws are swiveled outwardly, partially parallel to an axial direction, while the chuck jaws of the other group of chuck jaws are swiveled inwardly, partially antiparallel to the axial direction. A workpiece may subsequently be inserted into the diaphragm chuck up to a stop, or removed from the diaphragm chuck. As a result of a targeted pressure reduction in the diaphragm chuck, the chuck jaws are swiveled back, so that a workpiece situated in the diaphragm chuck is securely clamped between the chuck jaws. It is disadvantageous that, due to the partially oppositely directed swiveling of the chuck jaws along the axial direction, the workpiece is slightly dislodged from the stop when the workpiece is gripped by the chuck jaws, so that the workpiece is acted on with play in the axial direction. The first and second groups of chuck jaws are also designed as one piece, so that a selective replacement of a single group of chuck jaws and/or individual, for example closing, chuck jaws is not possible.

Another diaphragm chuck is known from the published German patent application document DE 1 128 254 A, this diaphragm chuck having only a single clamping diaphragm. This has the disadvantage that the chucking power decreases as the axial distance between the chucking point and the diaphragm surface increases.

BRIEF SUMMARY OF THE INVENTION

The diaphragm chuck according to the present invention and the machine tool according to the present invention have the advantage over the related art that on the one hand, at least two separate clamping diaphragms are used, so that high chucking power is achievable even at a comparatively large distance from the chuck, and high radial chucking power may be absorbed by the at least two clamping diaphragms which are situated axially separated from one another, and on the other hand, the at least two separate clamping diaphragms have a multipart design and are detachably connected to one another, so that it is easily possible to replace only a single clamping diaphragm. If one of the clamping diaphragms is defective or worn, unlike in the related art it is not absolutely necessary to replace both clamping diaphragms, thus advantageously significantly reducing the service and repair costs. In addition, when the second clamping diaphragm is uninstalled the first clamping diaphragm is exposed, so that maintenance work may also be easily carried out on the first clamping diaphragm. In particular, replacing individual first chuck jaws is thus possible. The diaphragm chuck according to the present invention is preferably mechanically, electrically, hydraulically, and/or pneumatically operable.

A further subject matter or a preferred specific embodiment of the present invention is a diaphragm chuck for a machine tool having a first clamping diaphragm and a second clamping diaphragm which is offset relative to the first clamping diaphragm along an axial direction, the first clamping diaphragm having multiple first chuck jaws and the second clamping diaphragm having multiple second chuck jaws, and for opening the first clamping diaphragm the first chuck jaws being movable partially parallel to the axial direction, and for opening the second clamping diaphragm the second chuck jaws being movable partially parallel to the axial direction. The first chuck jaws as well as the second chuck jaws advantageously move during the closing operation, and project on the axial axis in the same direction opposite the axial direction. This has the advantage that when a force is exerted on the workpiece in the axial direction in the direction of the diaphragm chuck, the first chuck jaws as well as the second chuck jaws are pushed into the closed position, so that stable chucking of the workpiece is always ensured, even when the workpiece is under axial load. In particular, displacement of the workpiece in the axial direction is thus effectively prevented after the workpiece is chucked. It is conceivable in particular that, as the result of an appropriate design of the diaphragm thicknesses, the particular chucking power is influenced in such a way that a displacement of the workpiece in the axial direction due to the occurring machining forces is prevented.

According to one optional preferred specific embodiment of the present invention, it is provided that the diaphragm chuck has a stop for axially fixing a workpiece which is inserted into the diaphragm chuck, the diaphragm chuck preferably being designed in such a way that when the first clamping diaphragm is closed, the first chuck jaws move toward the stop, antiparallel to the axial direction, and when the second clamping diaphragm is closed, the second chuck jaws move toward the stop, antiparallel to the axial direction. The workpiece is advantageously acted on by force in the direction of the stop when the chuck jaws are closed, thus reducing the play between the workpiece and the stop. Alternatively, the diaphragm chuck has no stop.

According to one preferred specific embodiment of the present invention, it is provided that the diaphragm chuck has a base body to which the first and the second clamping diaphragms are detachably fastened, and/or a spacer element is situated between the first and second clamping diaphragms. The distance between the first and the second clamping diaphragms is adjustable via the spacer element. The spacer element is preferably replaceable in a modular manner, so that, depending on the application, a suitable distance between the first and second clamping diaphragms is settable (for example, as a function of the length of the workpiece to be machined). Due to the detachable fastening of the second clamping diaphragm, the spacer element may be replaced comparatively quickly. The spacer element preferably includes a ring which extends in each case along the edge region of the first and second clamping diaphragms and in particular along a first and second fastening region.

According to one preferred specific embodiment of the present invention, it is provided that the first clamping diaphragm has a central first accommodation region to which the first chuck jaws are detachably connected, and an outer first fastening region in which the first clamping diaphragm is detachably fastened to the base body, the first clamping diaphragm having a first deformation region provided between the first accommodation region and the first fastening region in such a way that a deformation of the first deformation region causes a motion of the first chuck jaws for opening the first clamping diaphragm. The deformation of the first deformation region is preferably produced mechanically, hydraulically, and/or pneumatically. The detachable fastening of the first chuck jaws to the first accommodation region has the advantage that individual chuck jaws that are defective or worn, for example, may be replaced as needed.

According to one preferred specific embodiment of the present invention, it is provided that the diaphragm chuck has a plunger which is movable relative to the base body along the axial direction, and which is provided for causing a deformation of the first deformation region, and is in contact with the first clamping diaphragm. Mechanical operation of the diaphragm chuck is preferably made possible with the aid of the plunger. The plunger preferably pushes on the back side of the central first accommodation region, thus elastically deforming the first clamping diaphragm in its first deformation region in the axial direction. The first chuck jaws situated on the other side of the central first accommodation region are hereby separated from one another, so that the diaphragm chuck opens for removing or inserting a workpiece. When the plunger is retracted, the first clamping diaphragm moves back and once again assumes its starting state, as a result of which the first chuck jaws approach one another and, if necessary, a workpiece is chucked in the diaphragm chuck in a force-fit and form-locked manner. Mechanical operation is much easier and more cost-effective to achieve compared to pneumatic and hydraulic operating mechanisms.

According to one preferred specific embodiment of the present invention, it is provided that the second clamping diaphragm has a central second accommodation region to which the second chuck jaws are detachably connected, and an outer second fastening region in which the second clamping diaphragm is detachably fastened to the base body, the second clamping diaphragm having a second deformation region provided between the second accommodation region and the second fastening region in such a way that a deformation of the second deformation region causes a motion of the second chuck jaws for opening the second clamping diaphragm. Thus, the second clamping diaphragm advantageously has essentially the same design as the first clamping diaphragm.

According to one preferred specific embodiment of the present invention, it is provided that the diaphragm chuck has a pin which is fastened to the plunger, the pin being provided for causing a deformation of the second deformation region, and the pin protruding through an opening formed in the first clamping diaphragm and contacting the second clamping diaphragm. An operation of the plunger is thus also automatically transmitted to the second clamping diaphragm via the pin, so that the first as well as the second clamping diaphragm may be opened or closed solely by operating the plunger.

According to one preferred specific embodiment of the present invention, it is provided that the diaphragm chuck has at least one additional clamping diaphragm which is offset relative to the first and second clamping diaphragms in each case along an axial direction, the at least one additional clamping diaphragm having multiple further chuck jaws, and the additional clamping diaphragm being detachably connected to the first and second clamping diaphragms, and/or for opening the additional clamping diaphragm the further chuck jaws being movable partially parallel to the axial direction. The diaphragm chuck may advantageously be built as needed in a modular manner from any desired number of clamping diaphragms, it being possible to expand or reduce the diaphragm chuck by additional clamping diaphragms comparatively easily and quickly due to the detachable connection between the individual clamping diaphragms.

A further subject matter of the present invention is a machine tool which has the diaphragm chuck according to the present invention.

DETAILED DESCRIPTION OF THE INVENTION

Figure 1:
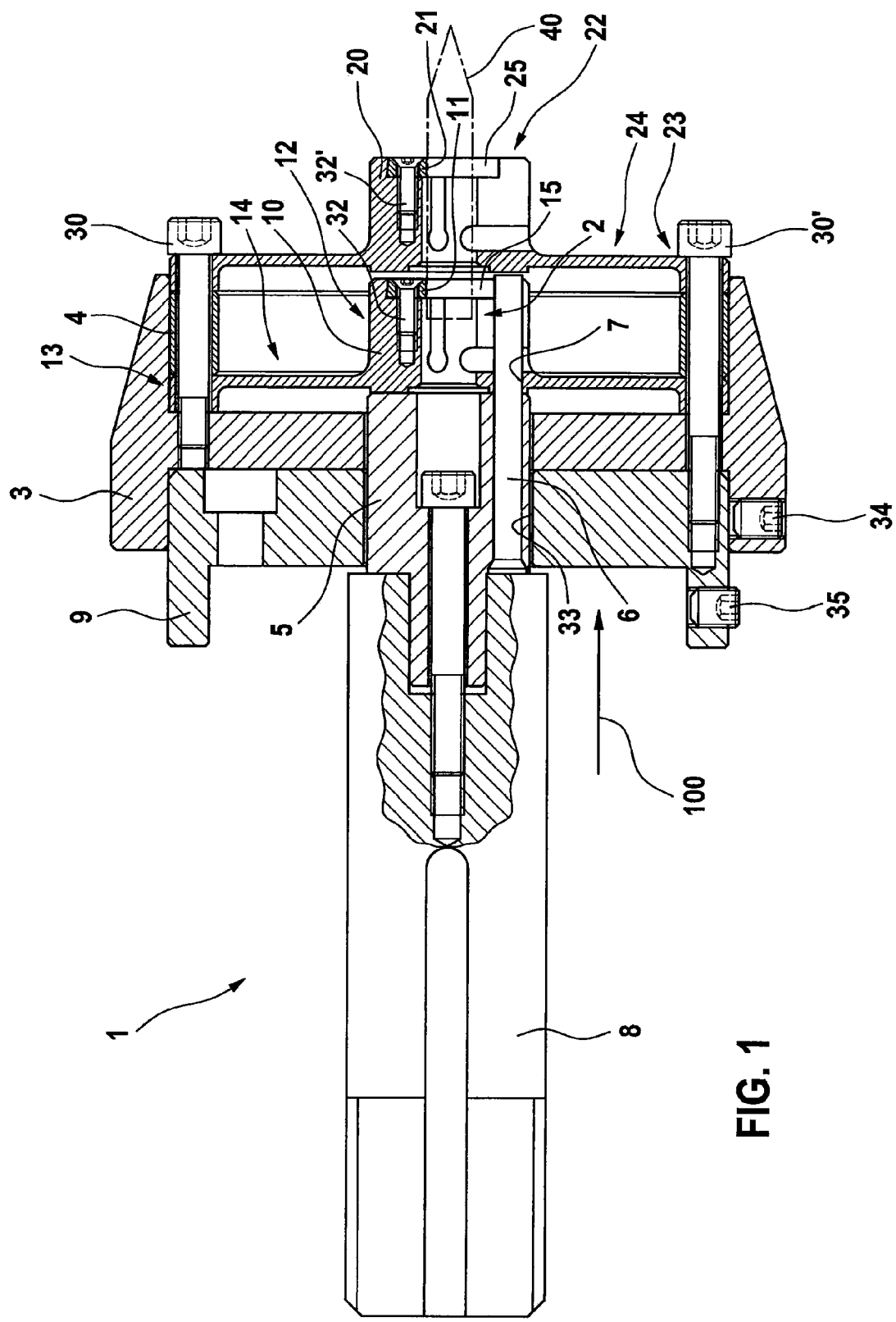
FIG. 1 shows a sectional view of a diaphragm chuck according to one exemplary specific embodiment of the present invention.

In the various figures, identical parts are always provided with the same reference numerals, and therefore are generally designated or mentioned only once in each case.

FIG. 1 illustrates a sectional view of a diaphragm chuck 1 according to one exemplary specific embodiment of the present invention. Diaphragm chuck 1 has a base body 3 designed as a chuck body, in the front inner diameter of which a first clamping diaphragm 10 and a second clamping diaphragm 20 as well as a spacer 4 in the form of a spacer ring are mounted. First and second clamping diaphragms 10, 20, respectively, are offset relative to one another along an axial direction 100 by the thickness of spacer 4. First clamping diaphragm 10 and second clamping diaphragm 20 are detachably connected to one another with the aid of first and second screws 30, 30', respectively, and are detachably fastened to base body 3. First clamping diaphragm 10 has an outer first fastening region 13, a central first accommodation region 12, and a first deformation region 14 which extends between first fastening region 13 and first accommodation region 12. Similarly, second clamping diaphragm 20 has an outer second fastening region 23, a central second accommodation region 22, and a second deformation region 24 which extends between second fastening region 23 and second accommodation region 22. First and second screws 30, 30' each extend through corresponding boreholes in first and second fastening regions 13, 23, respectively, first screws 30 being screwed into internal threads formed in base body 3.

In first accommodation region 12, three first chuck jaws 11 which are arranged in a rotationally symmetrical manner about the longitudinal axis of diaphragm chuck 1 are detachably fastened with the aid of further first screws 32. Similarly, in second accommodation region 22, three second chuck jaws 21 which are likewise arranged in a rotationally symmetrical manner about the longitudinal axis of diaphragm chuck 1 are detachably fastened with the aid of further second screws 32'. First and second chuck jaws 11, 21, respectively, preferably include commercially available circular indexable cutting inserts, which on the machine tool to be used are ideally milled to the workpiece inner diameter with slight pretensioning, or milled undersized by approximately 0.05 mm without pretensioning. Alternatively, it is conceivable for first and second chuck jaws 11, 21 to include, instead of circular cutting inserts only, linear, angular, and in particular polygonal cutting inserts which are also adapted to the outer geometry of workpiece 40.

Base body 3 has a central recess 33 in which a plunger 5 is displaceably supported relative to base body 3. In the present example, plunger 5 is detachably connected to an adapter piece 8, adapter piece 8 preferably being detachably coupleable to a clamping tube of a machine tool, not illustrated. Diaphragm chuck 1 also preferably has an adapter plate 9 which is fastened, in particular with the aid of second screws 32', to a back side of base body 3 facing away from first clamping diaphragm 10. Second screws 30' extend in each case through corresponding boreholes in first and second fastening region 13, 23, respectively, and in base body 3, and are screwed into internal threads of adapter plate 9. The relative position between adapter plate 9 and base body 3, in particular along a circumferential direction about the longitudinal axis, is laterally fixed in base body 3 by at least three first grub screws 34 which are distributed in a rotationally symmetrical manner about the periphery (concentric alignment). Adapter plate 9 is provided for being brought into contact with a front side of the machine tool (not illustrated), the relative position between adapter plate 9 and the machine tool, in particular along a circumferential direction about the longitudinal axis, being laterally fixed in adapter plate 9 by at least three second grub screws 35 which are distributed in a rotationally symmetrical manner about the periphery (concentric alignment). Adapter plate 9 is preferably screwed onto the machine tool in the axial direction by at least four screws.

First clamping diaphragm 10 is activated via plunger 5 and adapter piece 8 through a clamping tube of the machine tool. Plunger 5 pushes first accommodation region 12 parallel to axial direction 100; i.e., first accommodation region 12 is situated at a distance from base body 3 along axial direction 100. This is achieved by a deformation of first deformation region 14 due to the force exerted by plunger 5. To facilitate this deformation, first clamping diaphragm 10 has a reduced material thickness in first deformation region 14. As a result of the deflection of first accommodation region 12 along axial direction 100, first chuck jaws 11 move likewise partially along axial direction 100, and separate themselves from one another perpendicularly to axial direction 100. First clamping diaphragm 10 is opened in this way.

The motion of plunger 5 is further transmitted to pins 6 which are fixedly connected to plunger 5 and which extend in the direction of second chuck 20 through openings 7 formed in first clamping diaphragm 10. These pins 6 exert a force on central second accommodation region 22 of second clamping diaphragm 20, so that, similarly as for first clamping diaphragm 10, second clamping diaphragm 20 also opens when the clamping tube is activated. When first and second clamping diaphragms 10, 20, respectively, are open, a workpiece 40 may be inserted into diaphragm chuck 1 or removed from diaphragm chuck 1. When the force on plunger 5 decreases, first and second clamping diaphragms 10, 20 once again assume their starting position, and workpiece 40 is chucked by first and second chuck jaws 11, 21, respectively. Diaphragm chuck 2 also has a slot 2.

Figure 2:
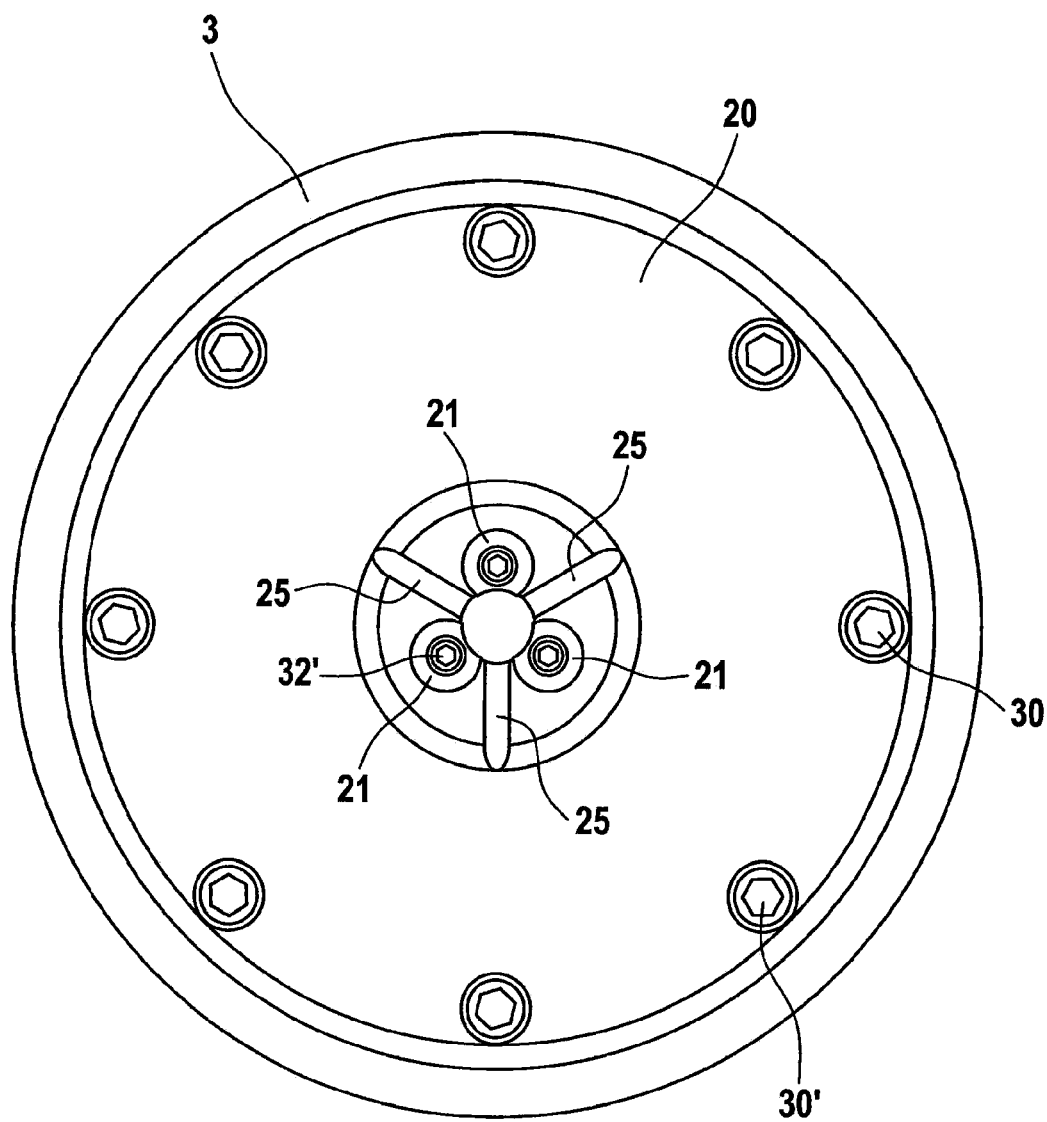
FIG. 2 shows a front view of the diaphragm chuck according to the exemplary specific embodiment of the present invention.

FIG. 2 illustrates a front view of diaphragm chuck 1 according to the exemplary specific embodiment of the present invention, in this illustration only second clamping diaphragm 20, second chuck jaws 21, further second screws 32', the edge of base body 3, and first and second screws 30, 30', respectively, being visible for perspective reasons. It is apparent that in second accommodation region 22, second clamping diaphragm 20 is provided with three second slots 25 which are distributed in a rotationally symmetrical manner about the longitudinal axis and which in each case extend radially outwardly from the longitudinal axis. Similarly, first clamping diaphragm 10 has first slots 15. In the circumferential direction, second clamping diaphragm 20 is fastened to first clamping diaphragm 10 and base body 3 by first and second screws 30, 30' in alternation. Workpiece 40 includes, for example, a metal rod and in particular a rod made of hard metal, from which a drill or chisel, for example, is produced with the aid of the machine tool.

Alternatively, it is conceivable for diaphragm chuck 1 according to the present invention to be operated with the aid of a hydraulic, electrical, or pneumatic operating device.

What is claimed is:

1. A diaphragm chuck for a machine tool, comprising: a first clamping diaphragm having multiple first chuck jaws; a second clamping diaphragm having multiple second chuck jaws, wherein the second clamping diaphragm is offset relative to the first clamping diaphragm along an axial direction via a spacer element, wherein the distance between the first and the second clamping diaphragms is adjustable via the spacer element, and wherein the first and second clamping diaphragms are detachably connected to one another; and at least one fastener which at least partially extends through the spacer element; wherein the spacer element includes a ring which extends along an edge region of the first and second clamping diaphragms.

2. The diaphragm chuck as recited in claim 1, wherein for opening the first clamping diaphragm the first chuck jaws are movable partially parallel to the axial direction, and for opening the second clamping diaphragm the second chuck jaws are movable partially parallel to the axial direction.

3. The diaphragm chuck as recited in claim 2, further comprising:
a base body to which the first and second clamping diaphragms are detachably fastened.

4. The diaphragm chuck as recited in claim 3, wherein the first clamping diaphragm has:
a central first accommodation region to which the first chuck jaws are detachably connected;
an outer first fastening region in which the first clamping diaphragm is detachably fastened to the base body; and
a first deformation region provided between the first accommodation region and the outer first fastening region in such a way that a deformation of the first deformation region causes a motion of the first chuck jaws for opening the first clamping diaphragm.

5. The diaphragm chuck as recited in claim 4, further comprising:
a plunger which is (i) movable relative to the base body along the axial direction, (ii) causes a deformation of the first deformation region, and (iii) in contact with the first clamping diaphragm.

6. The diaphragm chuck as recited in claim 4, wherein the spacer element includes a ring which extends along an edge region of the outer first fastening region.

7. The diaphragm chuck as recited in claim 3, wherein the second clamping diaphragm has:
a central second accommodation region to which the second chuck jaws are detachably connected;
an outer second fastening region in which the second clamping diaphragm is detachably fastened to the base body; and
a second deformation region provided between the second accommodation region and the second fastening region in such a way that a deformation of the second deformation region causes a motion of the second chuck jaws for opening the second clamping diaphragm.

8. The diaphragm chuck as recited in claim 7, further comprising:
a plunger which is movable relative to the base body along the axial direction; and
a pin which is fastened to the plunger and causes a deformation of the second deformation region, wherein the pin protrudes through an opening formed in the first clamping diaphragm and contacts the second clamping diaphragm.

9. The diaphragm chuck as recited in claim 7, wherein the spacer element includes a ring which extends along an edge region of the outer second fastening region.

10. The diaphragm chuck as recited in claim 1, wherein the spacer element is situated between the first and second clamping diaphragms.

11. A machine tool, comprising: a diaphragm chuck including: a first clamping diaphragm having multiple first chuck jaws; a second clamping diaphragm having multiple second chuck jaws, wherein the second clamping diaphragm is offset relative to the first clamping diaphragm along an axial direction via a spacer element, wherein the distance between the first and the second clamping diaphragms is adjustable via the spacer element, and wherein the first and second clamping diaphragms are detachably connected to one another; and at least one fastener which at least partially extends through the spacer element; wherein the spacer element includes a ring which extends along an edge region of the first and second clamping diaphragms.

* * * * *